United States Patent
Chang et al.

(10) Patent No.: US 10,381,163 B2
(45) Date of Patent: Aug. 13, 2019

(54) METHOD FOR ASSEMBLING FORCE SENSITIVE CAPACITOR

(71) Applicant: EGALAX_EMPIA TECHNOLOGY INC., Taipei (TW)

(72) Inventors: Chin-Fu Chang, Taipei (TW); Shang-Tai Yeh, Taipei (TW); Ping Siauw, Taipei (TW); Yu-Hao Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 454 days.

(21) Appl. No.: 15/012,072

(22) Filed: Feb. 1, 2016

(65) Prior Publication Data
US 2016/0225530 A1    Aug. 4, 2016

Related U.S. Application Data

(60) Provisional application No. 62/110,087, filed on Jan. 30, 2015.

(51) Int. Cl.
*H01G 5/14* (2006.01)
*H01G 5/013* (2006.01)
*H01G 5/16* (2006.01)
*H01G 5/38* (2006.01)
*H01G 5/014* (2006.01)
*G06F 3/0354* (2013.01)

(52) U.S. Cl.
CPC ........... *H01G 5/14* (2013.01); *G06F 3/03545* (2013.01); *H01G 5/014* (2013.01); *H01G 5/0136* (2013.01); *H01G 5/0138* (2013.01); *H01G 5/16* (2013.01); *H01G 5/38* (2013.01); *Y10T 29/43* (2015.01); *Y10T 29/435* (2015.01); *Y10T 29/49208* (2015.01)

(58) Field of Classification Search
CPC ............ H01G 5/014; H01G 5/14; H01G 5/16; H01G 5/38; H01G 5/0136; H01G 5/0138; G06F 3/03545; G01R 15/16; Y10T 29/43; Y10T 29/435; Y10T 29/49208
See application file for complete search history.

(56) References Cited

U.S. PATENT DOCUMENTS

| | | | | |
|---|---|---|---|---|
| 3,818,287 A | * | 6/1974 | Shirakawa | H01G 5/38 361/298.3 |
| 5,060,109 A | * | 10/1991 | Armistead | H01G 5/14 361/294 |
| 5,652,521 A | * | 7/1997 | Meyer | G01R 15/16 324/541 |
| 8,525,530 B2 | * | 9/2013 | Fukushima | H01G 5/16 324/658 |

FOREIGN PATENT DOCUMENTS

JP    2014013862 A  *  1/2014

* cited by examiner

*Primary Examiner* — A. Dexter Tugbang
(74) *Attorney, Agent, or Firm* — WPAT, PC (57) ABSTRACT

A method for assembling a force sensitive capacitor is provided. The method comprises: assembling an insulating member to a rear end of a rear-end moving part; inserting a front-end moving part and the rear-end moving part into a case from a front end and a rear end of the case, respectively, and assembling connecting portions of the front-end moving part and the rear-end moving part; assembling a compressible conductor to a front end of a conductor base; and inserting the conductor base into the case from the rear end of the case and assembling the conductor base to the case.

10 Claims, 7 Drawing Sheets

METHOD FOR ASSEMBLING FORCE SENSITIVE CAPACITOR

CROSS REFERENCE TO RELATED APPLICATIONS

This application claims priority under 35 U.S.C 119 to U.S. provisional patent application, 62/110,087, filed on Jan. 30, 2015, the disclosure of which is incorporated herein by reference.

BACKGROUND OF THE INVENTION

1. Field of the Invention

The present invention relates to force sensitive capacitor, and more particularly, to method for assembling the force sensitive capacitor.

2. Description of the Prior Art

Force sensitive capacitor (FSC) is a kind of passive component. Capacitance of FSC is changed according to the received pressure. Many electronics use FSC. One of these electronics is stylus. When tip of stylus contacts touch panel or touch screen, it is pressed. If the tip of stylus is physically connected to a FSC and a properly designed circuit is provided and configured to measure capacitance variation of the FSC, an output of the circuit can be used to reflect the pressure on the FSC, i.e., the pressure on the tip of stylus.

However, varies designs of FSC are not all well. Manufacturing and assembling methods for different designs of FSCs are different. Initial capacitance of one ill-designed FSC without being pressed varies significantly after assembling. As a result, two electronics equipped with the same design of FSC under a same pressure reflect different pressure values.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

One of objectives of the present invention is to provide a well-designed FSC and its assembling method. This kind of FSC is able to connect to a circuitry so as that output of the circuitry reflects the pressure level on the FSC by measuring the capacitance variation of the FSC.

In one embodiment of the present invention, a method for assembling a force sensitive capacitor is provided. The method comprises: assembling an insulating member to a rear end of a rear-end moving part; inserting a front-end moving part and the rear-end moving part into a case from a front end and a rear end of the case, respectively, and assembling connecting portions of the front-end moving part and the rear-end moving part; assembling a compressible conductor to a front end of a conductor base; and inserting the conductor base into the case from the rear end of the case and assembling the conductor base to the case.

After the front-end moving part being pressed backward, the joined rear-end moving part moves backward. Under the pressure of the insulating member, the compressible conductor deforms consequently. Hence, the capacitance value of the force sensitive capacitor changes accordingly.

One of objectives of the present invention is to provide a well-designed FSC and its assembling method. The assembling method can easily adjust capacitance value of the force sensitive capacitor such that the adjusted capacitance value is as the same as or close to a capacitance of a standard component which is precisely tested.

In one embodiment, the assembling method further comprises: measuring electrical characteristics of a standard component by a test instrument under a standard environment; connecting the front-end moving part and the conductor base to the test instrument, respectively, under the standard environment; and adjusting an internal position of the conductor base inside the case such that the electrical characteristics of the force sensing circuit are made to be the same or close to the electrical characteristics of the standard component.

After a position of the conductor base inside the case is adjusted, the deformation of the compressible conductor caused by the pressure of the insulating member is controlled. Thus the capacitance value of the force sensitive capacitor is adjusted.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 1:
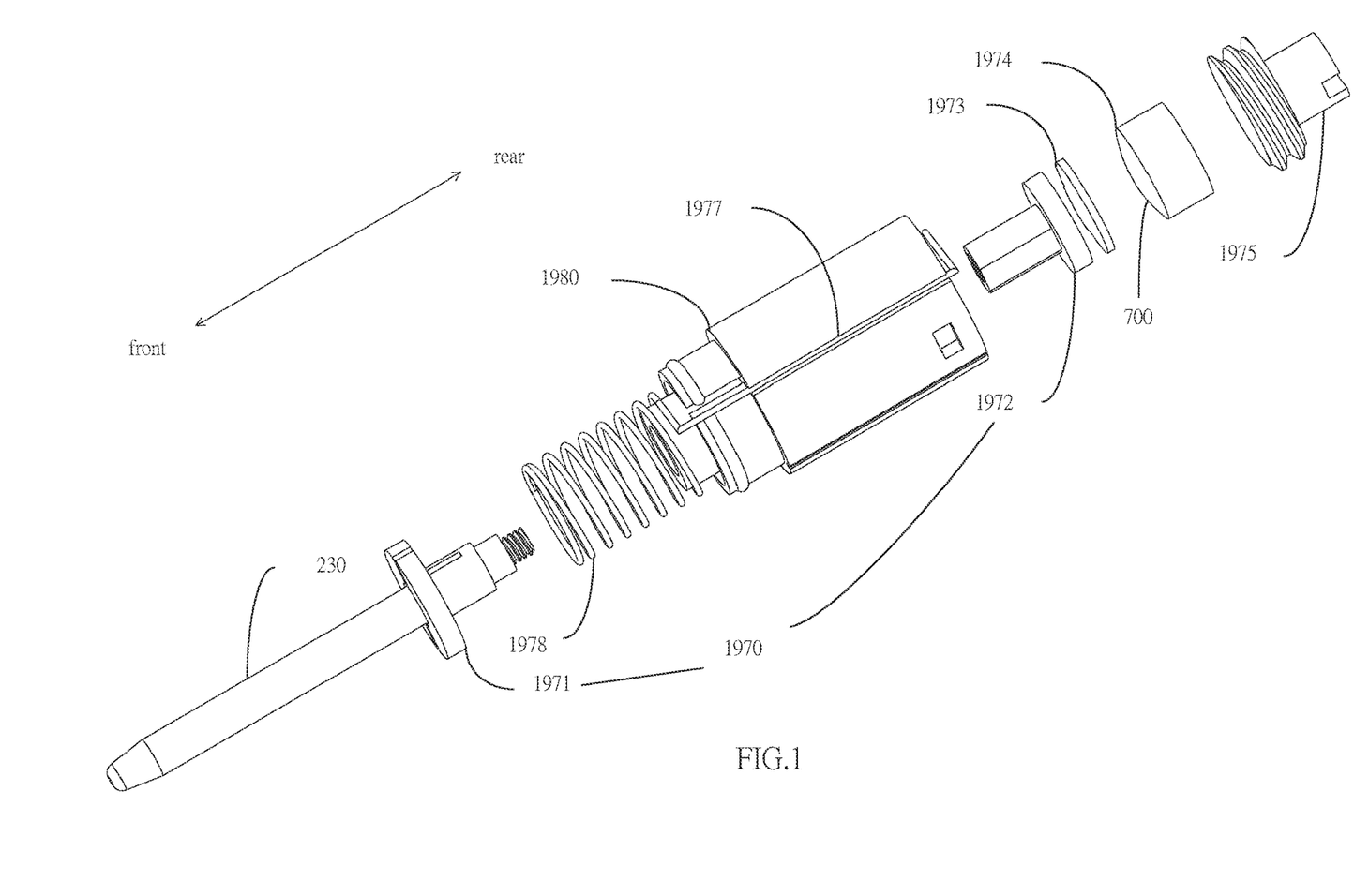
FIG. 1 shows an explosive view diagram of a FSC of a stylus in accordance with an embodiment of the present invention.

Please refer to FIG. 1, which shows an explosive view diagram of a FSC of a stylus in accordance with an embodiment of the present invention. The tip of the stylus is referred to as the "front end", whereas the opposite end to this is referred to as the "rear end."

The pen tip section 230 is a rod-shaped conductive element. Its front end can be used for making contact with a touch panel. The rear end of the pen tip section may include a connecting portion for connecting a front-end moving part 1971.

The front end of the front-end moving part 1971 may include a connecting portion for connecting with the connecting portion of the pen tip section 230. The front end of the front-end moving part 1971 may further include a annular protrusion that is used as a force application point for an elastic member 1978. The rear end of the front end moving part 1971 may include another connecting portion for connecting with a rear-end moving part 1972 through an inner channel of a case 1980. In case the front-end moving part 1971 and the rear-end moving part 1972 are joined together as a moving part 1970 that may move along the axis of the stylus within the channel of the case 1980.

The front end of the rear-end moving part 1972 may include a connecting portion for connecting with the front-end moving part 1971. In an embodiment, the pen tip section 230, the front-end moving part 1971 and the rear-end moving part 1972 connected with one another are all conductive elements and are electrically coupled with one another. These three components can be made of metal, such as copper, aluminum or aluminum alloy, but are not limited thereto. The read end moving part 1972 may include the connecting portion with smaller cross sectional area and an engaging portion with larger cross sectional area. Besides, in order to have better writing user experience or to avoid damage, the pen tip section 230 may be made of slightly elastic material such as a harden and shaped mixture of epoxy and conductive carbon. The case 1980 may include hollow tubes. In this embodiment, for example, the case 1980 include two or more connected tubes. The diameter of a front tube is smaller than the diameters of an intermediate tube and a rear tube. The diameter of the intermediate tube is smaller than the diameter of the rear tube. The external space of the front tube with a smaller diameter may be used to receive the elastic member 1978. In this embodiment, the elastic member 1978 is a spring circulating the outer surface of the front tube. The internal space of the front tube and the intermediate tube is used for accommodating the connecting portions of the front-end moving part 1971 and/or the rear-end moving part 1972. In another embodiment, only a front tube and a rear tube with different diameters are provided. The rear tube has a larger diameter and can be used to accommodate the receiving portion and/or the engaging portion of the read-end moving part 1972. In other words, a large portion of the moving part 1970, after being assembled, is remained inside the case 1980, only a small portion of the front-end moving part 1971 is exposed. The moving part 1970 may move along the axis of the stylus within the case 1980, creating a stroke 1. This stroke 1 will be further explained in the FIG. 7. Since the pen tip section 230 is connected with the front-end moving part 1971, the pen tip section may also move along the axis of the stylus in the same stroke 1.

Although the case 1980 shown in the FIG. 1 are round tubes with cylindrical internal space, the present invention is not limited thereto. In one embodiment, the outer and inner cross sections of the case 1980 may be elliptical or polygonal, such as triangular, square, pentagonal, or other polygonal shapes. The cross sectional of the moving part 1970 may be adjusted accordingly, and is not limited to a particular shape, either.

The two ends of the elastic member 1978 abut the intermediate tube of the case 1980 and the front-end moving part 1971, respectively, in order to provide spring force to moves these two components away from each other. Thus, in case the pen tip section 230 is not under any backward pressure, it will stay on one end of the stroke 1.

The elastic member 1978 may be a conductive element, which is connected to a wire 1977. The elastic member 1978 and the wire 1977 may be integrally formed, or may be made separately and then combined. In one embodiment, the surfaces of the elastic member 1978, the wire 1977, and/or the case 1980 may be covered with an insulating material, such as insulating paint. Since the annular protrusion of the front-end moving part 1971 is in electrical contact with the elastic member 1978, the pen tip section 230 and the moving part 1970 can be electrically coupled to the wire 1977 through the elastic member 1978. A groove for receiving the wire 1977 can be provided at a location on the surface of the case 1980 corresponding to the wire 1977. The wire 1977 is connected to a circuitry behind the case 1980.

An insulating member 1973 is provided on the receiving portion of the rear-end moving part 1972. In an embodiment, the insulating member 1973 may be a layer of insulating paint. In another embodiment, the insulating member 1973 may be a ceramic sheet. Its composition may include barium oxide, zinc oxide, and/or tellurium oxide. The shape and the area of the insulating member 1973 may match the shape and the area of the engaging surface of the rear-end moving part 1972. Alternatively, the area of the insulating member 1973 may be greater than that of the engaging surface. In an embodiment, the ceramic sheet can be coated with a layer of metal, such as silver, to facilitate soldering of it to the engaging surface of the rear-end moving part 1972. In another embodiment, the insulating member 1973 may be adhered to the engaging surface with an adhesive. The present invention does not limit the method by which the insulating member 1973 is secured to the rear-end moving part 1972.

A compressible conductor 1974 is located at the rear of the insulating member 1973. It has a contact surface 700 at the front. The shapes of the contact surfaces of the compressible conductor 1974 and the insulating member 1973 have been described with several examples in the previous two applications, and the present invention does not limit the shape of the contact surface 700. In an embodiment, the compressible conductor 1974 is a conductive rubber, or a compressible object doped with a conductive material.

A conductor base 1975 is located at the rear of the compressible conductor 1974 and connected with the compressible conductor 1974. In one embodiment, the conductor base 1975 is a conductive element, and electrically coupled with the compressible conductor 1974. In another embodiment, the conductor base 1975 and the compressible conductor 1974 are bonded together with a conductive adhesive. The conductive base 1975 is made, for example, of a metal material.

The conductor base 1975 has a connecting portion, such as threads on the outer peripheral surface thereof, for engaging with a respective connecting portion on the inner surface of the case 1980. The rear end of the conductor base 1975 may include a groove for assembly using a tool. In an embodiment, the connecting portion of the conductor base 1975 is a threaded portion, and the connecting portion on the interior cavity of the case 1980 is also a corresponding threaded portion. The groove at the rear end of the conductor base 1975 is a slot, allowing the conductor base 1975 to be driven into the case 1980 with a flat-bladed screwdriver. In other embodiments, the shape of groove at the rear end of the conductor base 1975 may be a cross or other shapes, allowing the conductor base 1975 to be driven into the case 1980 with a correspondingly shaped screwdriver.

Figure 2A:
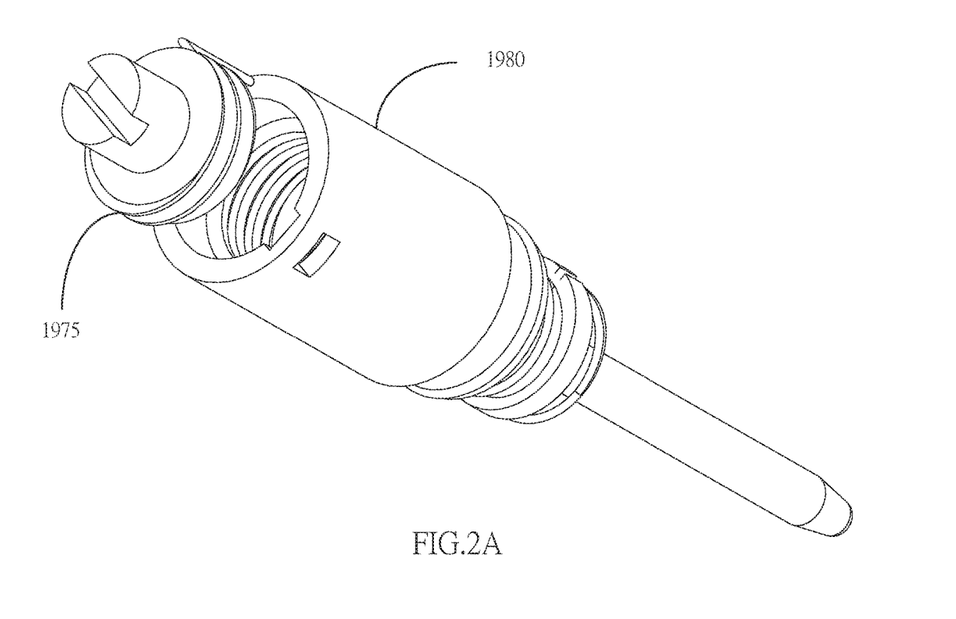
FIG. 2A shows a schematic diagram illustrating a situation in which the conductor base 1975 has not yet been driven into the case 1980 is shown.
Figure 2B:
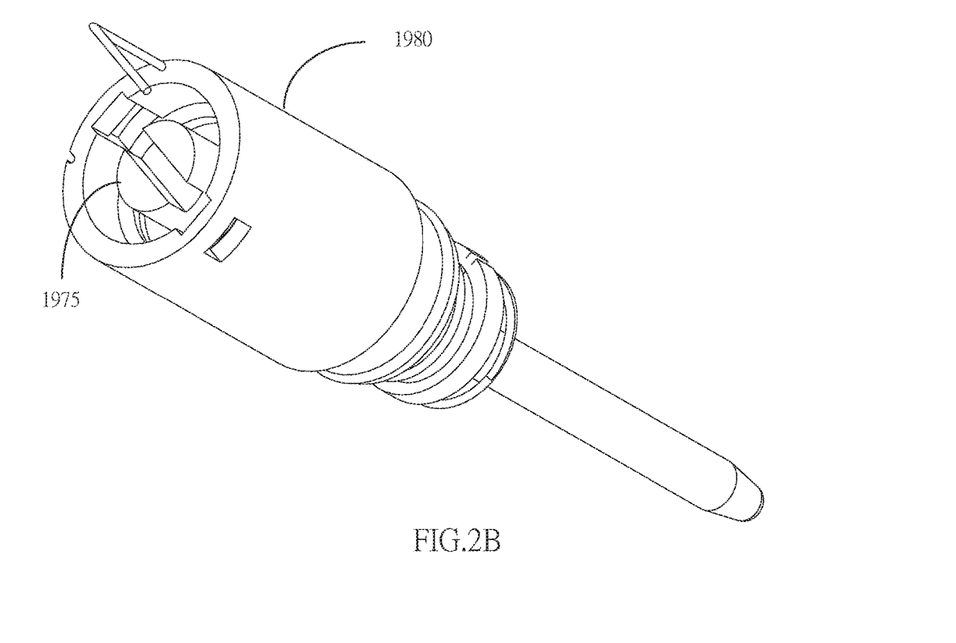
FIG. 2B is a schematic diagram illustrating a situation in which the conductor base 1975 has been driven into the case 1980 is shown.

Please refer to FIG. 2A which shows a schematic diagram illustrating a situation in which the conductor base 1975 has not yet been driven into the case 1980 is shown. Referring to FIG. 2B, a schematic diagram illustrating a situation in which the conductor base 1975 has been driven into the case 1980 is shown. In an embodiment, the connecting portion of the conductor base 1975 is coated with an adhesive so that the conductor base 1975 can be firmly attached to inside of the case 1980 after it is screwed into the case 1980 and the relative positions of the two are adjusted. In another embodiment, the adhesive is not required.

Figure 3A:
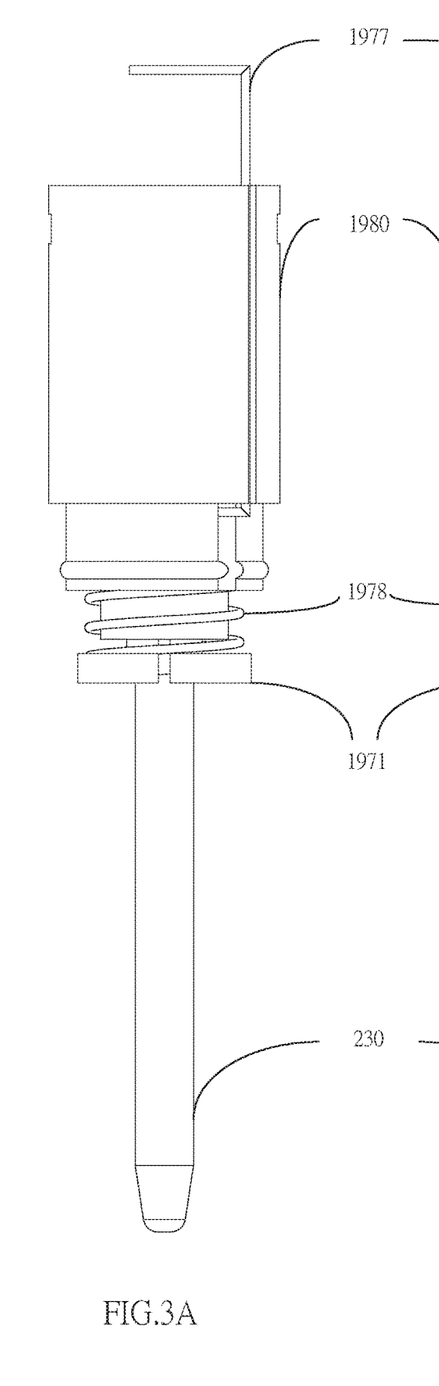
FIGS. 3A and 3B which depict schematic diagrams illustrating the structure of the stylus when assembly is complete are shown.
Figure 3B:
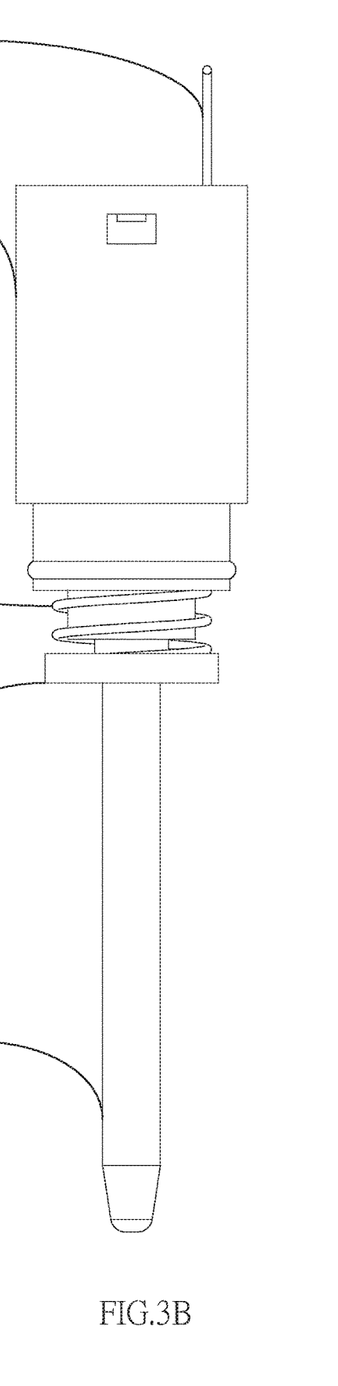

Please refer to FIGS. 3A and 3B which depict schematic diagrams illustrating the structure of the stylus when assembly is complete are shown. FIG. 3A particularly highlights the wire 1977 and the corresponding groove on the case 1980. On the other hand, in FIG. 3B, the wire 1977 and corresponding groove on the case 1980 cannot be seen. It should be noted that the lower end of the elastic member 1978 abuts the annular protrusion of the pen tip section 230, while the upper end thereof abuts the case 1980.

Figure 4:
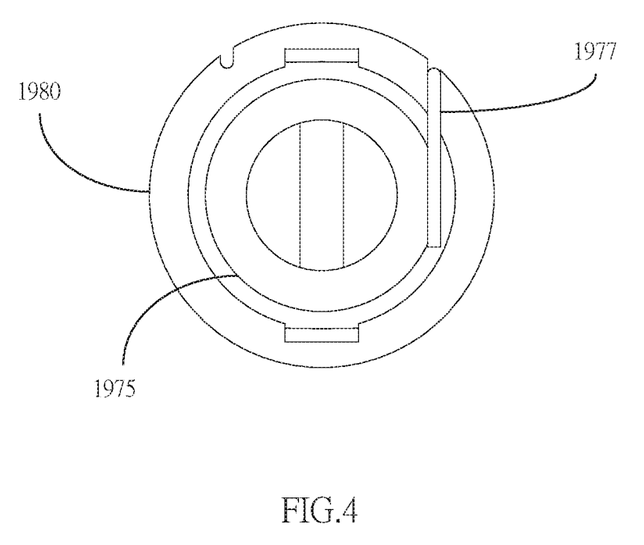
FIG. 4 illustrates a schematic diagram illustrating the structure of the stylus from the rear end is shown.

Please refer to FIG. 4, which illustrates a schematic diagram illustrating the structure of the stylus from the rear end is shown. The conductor base 1975 is placed in the interior cavity of the case 1980. The conductor base includes the groove at the rear end for assembly, for example, a slot as shown. A portion of the wire 1977 is bent over the case 1980.

Figure 5:
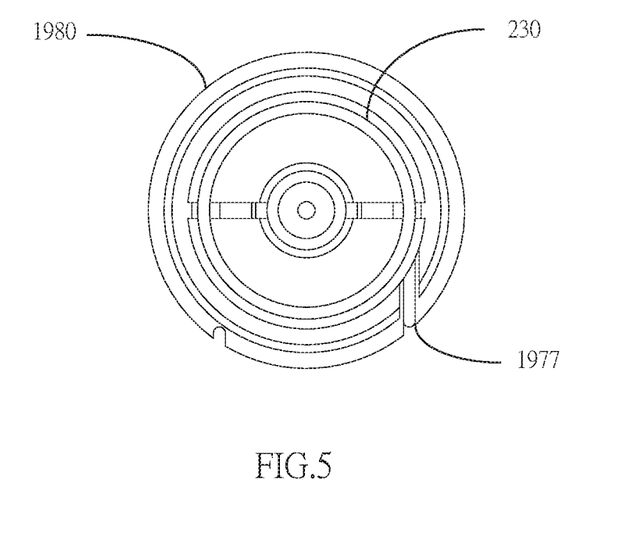
FIG. 5 shows a schematic diagram illustrating the structure of the stylus from the front end is shown.

Please refer to FIG. 5, which shows a schematic diagram illustrating the structure of the stylus from the front end is shown. Two cylinders of the case 1980 with different diameters can be seen. In the middle are the pen tip section 230 and its annular protrusion. The wire 1977 is connected to the elastic member 1978 intercepted by the annular protrusion.

The FSC provided by the present application includes the insulating member 1973, the moving part 1970 in front of the insulating member 1973 and the compressible conductor 1974 at the back of the insulating member 1973. Due to differences in the manufacturing tolerances and the assembly process, initialization calibration needs to be added into the assembly process to achieve consistency among the electrical characteristics of each structure, such that the sensing device in the stylus can correctly calculate the level of force experienced by the pen tip section 230.

Figure 6:
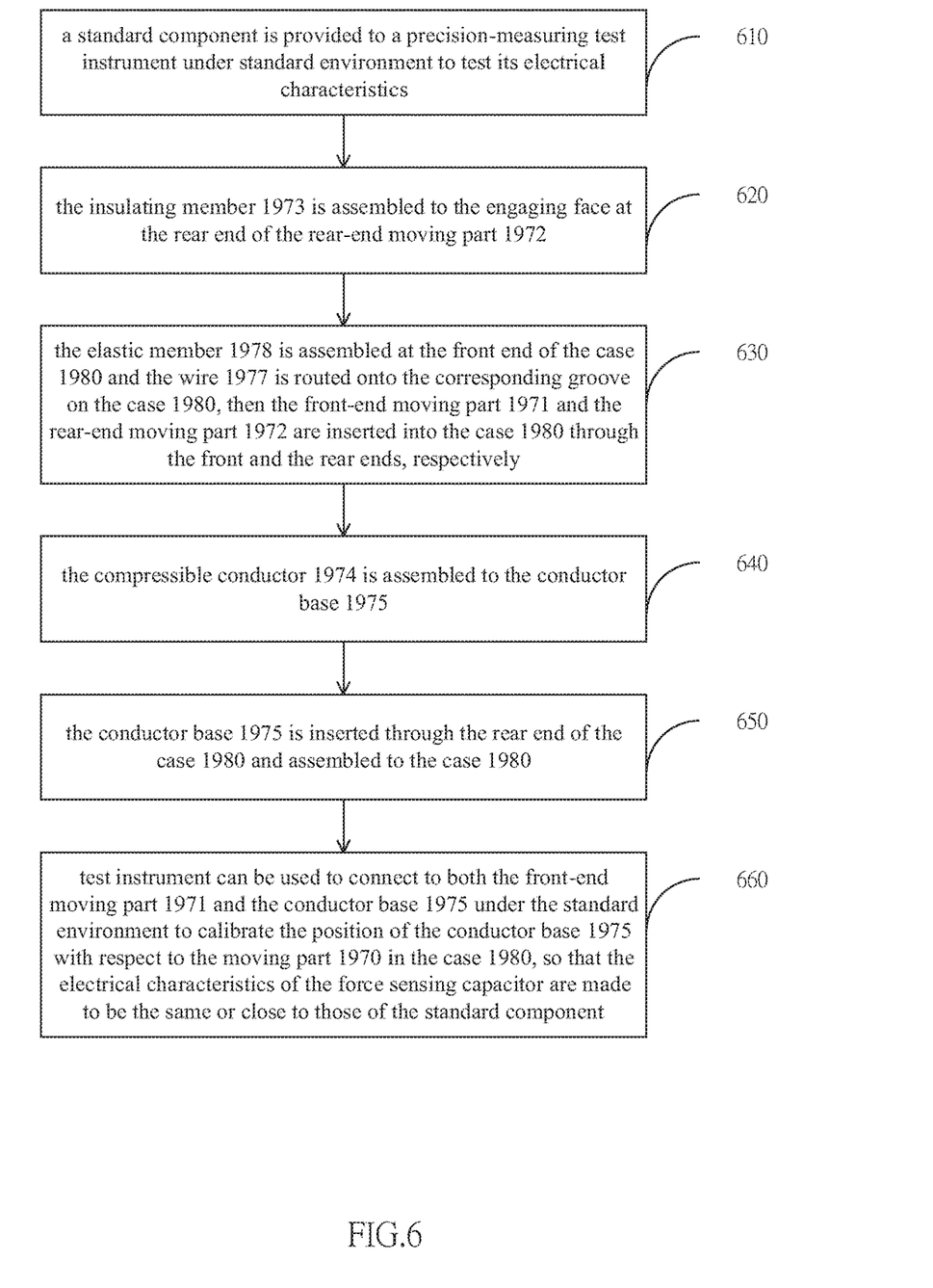
FIG. 6 depicts a flowchart illustrating the assembly process of the stylus structure of FIG. 1 is shown.

Please refer to FIG. 6 which depicts a flowchart illustrating the assembly process of the stylus structure of FIG. 1 is shown. If there is no causal relationship between the various steps, the present invention does not limit the order in which they are carried out. Further, additional steps can be added between the steps shown herein. The descriptions of the various elements illustrated in FIG. 6 can be found in the embodiments of FIG. 1 to FIG. 5.

In step 610, a standard component is provided to a precision-measuring test instrument under standard environment to test its electrical characteristics. In an embodiment, the standard component can be a standard capacitor used for calibrating the force sensing capacitor of the stylus, and it has a predetermined capacitance and/or other electrical characteristics. The standard environment may include standard temperature and standard humidity, such as room temperature 25 degrees Celsius and 60% humidity. The electrical characteristics tested by the test instrument can be used as reference values.

In step 620, the insulating member 1973 is assembled to the engaging face at the rear end of the rear-end moving part 1972. For example, the insulating member 1973 is adhered to the rear-end moving part 1972 by an adhesive, or connected to the rear-end moving part 1972 via a connecting portion. Alternatively, a ceramic insulating member with a metal- or conductor-coated engaging face can be soldered to the rear-end moving part 1972.

In step 630, first, the elastic member 1978 is assembled at the front end of the case 1980 and the wire 1977 is routed onto the corresponding groove on the case 1980, then the front-end moving part 1971 and the rear-end moving part 1972 are inserted into the case 1980 through the front and the rear ends, respectively, with the connecting portions of the two moving parts joined together, such that the front end of the elastic member 1978 abuts the annular protrusion of the front-end moving part 1971, providing the spring force that pushes the pen tip section 230 away from the case 1980. In an embodiment, the front-end moving part 1971 and the rear-end moving part 1972 are joined together by screws and threads. In another embodiment, the two members are joined together with an adhesive.

In step 640, the compressible conductor 1974 is assembled to the conductor base 1975. These two components can be joined together by adhesion, fastening, soldering and the like. It should be noted that the present invention does not limit the order in which steps 620, 630 and 640 are carried out.

In step 650, first, the conductor base 1975 is inserted through the rear end of the case 1980 and assembled to the case 1980. As previously described, the conductor base 1975 may include a connecting portion (e.g. a screw) so that the conductor base 1975 can be screwed onto the threads surrounding the interior cavity of the case. The rear end of the conductor base 1975 may include a groove such as a slot, a cross or other polygonal shapes, allowing a tool to engage with the groove to control and adjust the depth by which the conductor base 1975 is inserted into the case 1980. In an embodiment, the fastener (e.g. a screw) is coated with an adhesive.

Since the force sensing capacitor includes the moving part 1970 and the compressible conductor 1974 at the front and rear ends of the insulating member 1973, in step 660, the test instrument can be used to connect to both the front-end moving part 1971 and the conductor base 1975 under the standard environment to calibrate the position of the conductor base 1975 with respect to the moving part 1970 in the case 1980, so that the electrical characteristics of the force sensing capacitor are made to be the same or close to those of the standard component.

If an adhesive is added in step 650, step 660 will need to be performed immediately after step 650 in order to avoid premature curing of the adhesive. If that happens, the position of the conductor base 1975 with respect to the moving part 1970 in the case 1980 cannot be adjusted correctly in step 660. Up until step 660, a complete structure of a force sensing capacitor can be provided.

Figure 7:
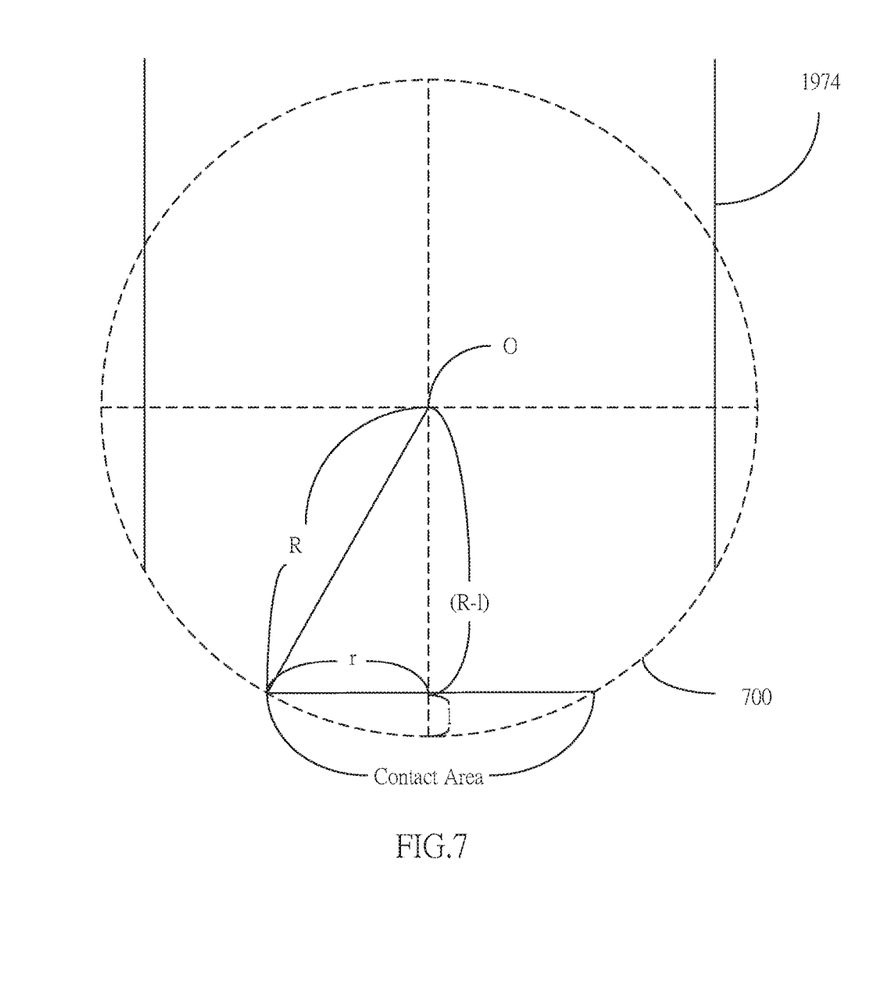
FIG. 7 depicts a cross-sectional schematic view of the center of the contact surface 700 of the compressible conductor 1974 in accordance with an embodiment is shown.

Please refer to FIG. 7, which depicts a cross-sectional schematic view of the center of the contact surface 700 of the compressible conductor 1974 in accordance with an embodiment is shown. As previously mentioned, the contact surface 700 of the compressible conductor 1974 can have a variety of shapes. However, in the embodiment shown in FIG. 7, the contact surface is spherical. From a cross-sectional view, the contact surface is a circle.

Normally, when assembled as described in FIG. 6, the insulating member 1973 will touch the compressible conductor 1974 slightly and forms a circular contact area. Assuming the radius of the sphere is R, the compression stroke is I, and the contact area of the sphere is r, and according to the Pythagorean Theorem, the square sum of the two short sides of a triangle equals to for the square of the long side, Equation (1) can then be obtained.

$$R^2 = r^2 + (R-I)^2 \quad (1)$$

The capacitance C of the force sensing capacitor provided in the present invention is proportional to the corresponding areas of the two conductors, and inversely proportional to the distance between the two conductors. As the insulating member 1973 is incompressible or its compression factor is far less than that of the compressible conductor 1974, the distance between the two conductors is thus equal to the thickness of the insulating member 1973. In other words, the distance between the two conductors is a constant.

When the pen tip section 230 moves towards the rear end due to an exerted force, the moving part 1970 and the insulating member 1973 compresses the compressible conductor 1974 behind them, such that the aforementioned compression stroke I is increased, and the contact area is also increased, thereby increasing the capacitance C. This contact area is represented by the following Equation (2).

$$A = \pi r^2 \quad (2)$$

r in Equation (2) is then replaced by R and I in Equation (1), thus giving Equation (3).

$$A = \pi(2R-I)I \quad (3)$$

Assuming R is much greater than I, Equation (4) is obtained.

$$A' \approx = 2\pi R I \quad (4)$$

The difference ratio between A and A' can be represented by the following Equation (5).

$$\text{Ratio} = (A'-A)/A' \quad (5)$$

Then Equations (3) and (4) are substituted into Equation (5) to give Equation (6).

$$\text{Ratio} = I/2R \quad (6)$$

In other words, the difference ratio can be adjusted by controlling the values of R and I. In designing the contact surface of the compressible conductor 1974, the value of R can be controlled. When adjusting the relative positions of the conductor base 1975 and the case 1980, the value of I can be controlled. As such, based on the manufacturer's tolerance level at the time, these two values can be designed in such a way as to minimize the difference ratio.

In one embodiment of the present invention, a method for assembling a force sensitive capacitor is provided. The method comprises: assembling an insulating member to a rear end of a rear-end moving part; inserting a front-end moving part and the rear-end moving part into a case from a front end and a rear end of the case, respectively, and assembling connecting portions of the front-end moving part and the rear-end moving part; assembling a compressible conductor to a front end of a conductor base; and inserting the conductor base into the case from the rear end of the case and assembling the conductor base to the case.

In one instance, the method further comprising: prior to said inserting the front-end moving part into the case, assembling an elastic member to the front end of the case such that the elastic member abuts a annular protrusion of the front-end moving part and front-end structure of the case.

In one embodiment, the method further comprising: measuring electrical characteristics of a standard component by a test instrument under a standard environment; connecting the front-end moving part and the conductor base to the test instrument, respectively, under the standard environment; and adjusting an internal position of the conductor base inside the case such that the electrical characteristics of the force sensing circuit are made to be the same or close to the electrical characteristics of the standard component.

In one embodiment, the electrical characteristics include a capacitance value.

In one embodiment, said assembling the insulating member to the rear end of the rear-end moving part further comprises one of the following steps: attaching the insulating member to the rear-end moving part by using adhesive; connecting the insulating member to a connecting portion of the rear moving part; and soldering the insulating member with a metal-coated or a conductor-coated face to the rear-end moving part.

In one embodiment, said assembling connecting portions of the front-end moving part and the rear-end moving part further comprises one of the following steps: engaging screws and threads of the connecting portions of the front-end moving part and the rear-end moving part; and attaching the connecting portions of the front-end moving part and the rear-end moving part by using adhesive.

In one embodiment, said assembling the compressible conductor to the front end of the conductor base further comprises one of the following steps: using adhesive; engaging screws and threads of the compressible conductor and the conductor base; and soldering the compressible conductor to the conductor base.

In one embodiment, said assembling the conductor base to the case further comprises screwing the conductor base onto threads surrounding interior cavity of the case. In some instances, a rear end of the conductor base includes a groove such as a slot, a cross or other polygonal shapes, said assembling the conductor base to the case further comprises screwing the conductor base onto threads surrounding interior cavity of the case by using a tool to engage the groove.

In one embodiment, a contact surface of the compressible conductor facing the insulating member is sphere, a difference ratio between maximum and minimum capacitances of the force sensitive capacitor is inversely proportional to a radius of the sphere and the difference ratio is proportional to a compression stroke of the rear moving part inside the case.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A method for assembling a force sensitive capacitor, comprising:

assembling an insulating member to a rear end of a rear-end moving part;

inserting a front-end moving part and the rear-end moving part into a case from a front end and a rear end of the case, respectively, and assembling connecting portions of the front-end moving part and the rear-end moving part, wherein the front-end moving part and the rear-end moving part are assembled as a moving part which moves within the front end and the rear end of the case;

assembling a compressible conductor to a front end of a conductor base, wherein the insulating member is disposed between the rear end moving part and the compressible conductor; and inserting the conductor base into the case from the rear end of the case and assembling the conductor base to the case.

2. The method of claim 1, further comprising:

prior to said inserting the front-end moving part into the case, assembling an elastic member to the front end of the case such that the elastic member abuts an annular protrusion of the front-end moving part and front-end structure of the case.

3. The method of claim 1, further comprising:

measuring electrical characteristics of a standard component by a test instrument under a standard environment;

connecting the front-end moving part and the conductor base to the test instrument, respectively, under the standard environment; and adjusting an internal position of the conductor base inside the case such that the electrical characteristics of the force sensing circuit are made to be the same or close to the electrical characteristics of the standard component.

4. The method of claim 3, wherein the electrical characteristics include a capacitance value.

5. The method of claim 1, wherein said assembling the insulating member to the rear end of the rear-end moving part further comprises one of the following steps:

attaching the insulating member to the rear-end moving part by using adhesive;

connecting the insulating member to a connecting portion of the rear moving part; and soldering the insulating member with a metal-coated or a conductor-coated face to the rear-end moving part.

6. The method of claim 1, wherein said assembling connecting portions of the front-end moving part and the rear-end moving part further comprises one of the following steps:

engaging screws and threads of the connecting portions of the front-end moving part and the rear-end moving part; and attaching the connecting portions of the front-end moving part and the rear-end moving part by using adhesive.

7. The method of claim 1, wherein said assembling the compressible conductor to the front end of the conductor base further comprises one of the following steps:

using adhesive;

engaging screws and threads of the compressible conductor and the conductor base; and soldering the compressible conductor to the conductor base.

8. The method of claim 1, wherein said assembling the conductor base to the case further comprises screwing the conductor base onto threads surrounding an interior cavity of the case.

9. The method of claim 8, wherein a rear end of the conductor base includes a groove, said assembling the conductor base to the case further comprises screwing the conductor base onto the threads surrounding the interior cavity of the case by using a tool to engage the groove.

10. The method of claim 1, wherein a contact surface of the compressible conductor facing the insulating member is a part of an entire sphere surface, a difference ratio between maximum and minimum capacitances of the force sensitive capacitor is inversely proportional to a radius of the entire sphere surface and the difference ratio is proportional to a compression stroke of the rear moving part inside the case.

* * * * *